United States Patent
Lee et al.

(10) Patent No.: US 9,688,057 B2
(45) Date of Patent: Jun. 27, 2017

(54) MULTILAYERED BIODEGRADABLE FILM

(75) Inventors: Deuk-Young Lee, Suwon-si (KR); Sang Il Kim, Suwon-si (KR)

(73) Assignee: SKC CO., LTD, Suwon-si (KR)

( * ) Notice: Subject to any disclaimer, the term of this patent is extended or adjusted under 35 U.S.C. 154(b) by 707 days.

(21) Appl. No.: 13/880,229

(22) PCT Filed: Oct. 19, 2011

(86) PCT No.: PCT/KR2011/007784
§ 371 (c)(1),
(2), (4) Date: Jul. 17, 2013

(87) PCT Pub. No.: WO2012/053820
PCT Pub. Date: Apr. 26, 2012

(65) Prior Publication Data
US 2013/0295355 A1    Nov. 7, 2013

(30) Foreign Application Priority Data

Oct. 22, 2010    (KR) ........................ 10-2010-0103410

(51) Int. Cl.
*B32B 7/02* (2006.01)
*B32B 27/08* (2006.01)
*B32B 27/36* (2006.01)

(52) U.S. Cl.
CPC ................ *B32B 27/08* (2013.01); *B32B 7/02* (2013.01); *B32B 27/36* (2013.01); *B32B 2250/05* (2013.01); *B32B 2250/244* (2013.01); *B32B 2250/42* (2013.01); *B32B 2307/518* (2013.01); *B32B 2307/7163* (2013.01); *Y10T 428/2495* (2015.01); *Y10T 428/31794* (2015.04)

(58) Field of Classification Search
CPC ................................ B32B 27/08; B32B 27/36
See application file for complete search history.

(56) References Cited

U.S. PATENT DOCUMENTS

| | | | |
|---|---|---|---|
| 6,960,374 B1 | 11/2005 | Terada | |
| 2007/0099016 A1 | 5/2007 | Nakamura et al. | |
| 2010/0183843 A1 | 7/2010 | Kim et al. | |
| 2010/0233498 A1* | 9/2010 | Kim | B32B 27/36 |
| | | | 428/480 |

FOREIGN PATENT DOCUMENTS

| | | | |
|---|---|---|---|
| EP | 1598181 A1 | 11/2005 | |
| EP | 1619021 A1 | 1/2006 | |
| EP | 1942001 A1 | 7/2008 | |
| JP | 2006015720 A | * | 1/2006 |
| JP | 2006015723 A | * | 1/2006 |
| JP | 2006-035666 A | 2/2006 | |
| KR | 10-2005-0102639 A | 10/2005 | |
| KR | 10-0675606 B1 | 1/2007 | |
| KR | 10-0872280 B1 | 12/2008 | |
| KR | 10-2009-0017867 A | 2/2009 | |
| KR | 10-2010-0073479 A | 7/2010 | |

OTHER PUBLICATIONS

Machine translation of JP2006-015720. Retrieved Sep. 3, 2015.*
Machine translation of JP2006-015723. Retrieved Sep. 3, 2015.*
Herrera et al. "Characterization and Degradation Behavior of Poly(butylene adipate-co-terephthalate)s". Journal of Polymer Science: Part A: Polymer Chemistry, vol. 40, (2002); pp. 4141-4157.*
European Patent Office, Communication dated Jun. 27, 2016, issued in corresponding European Application No. 11834620.4.

* cited by examiner

*Primary Examiner* — Prashant J Khatri
(74) *Attorney, Agent, or Firm* — Sughrue Mion, PLLC

(57) ABSTRACT

A multilayered biodegradable film comprising at least one first resin layer and at least one second resin layer, wherein the first and second resin layers are alternately layered; the first resin layer comprises a polylactic acid-based polymer; the second resin layer comprises an aliphatic polyester-based resin or an aliphatic-aromatic copolymerized polyester-based resin; and the film has a coloring peak value of 0.3 or less, a haze of 10% or less, and an elastic modulus of 300 kgf/mm$^2$ or less, exhibits improved flexibility and transparency, which is useful for environmentally friendly packaging.

6 Claims, No Drawings

MULTILAYERED BIODEGRADABLE FILM

CROSS REFERENCE TO RELATED APPLICATIONS

This application is a National Stage of International Application No. PCT/KR2011/007784 filed Oct. 19, 2011, claiming priority based on Korean Patent Application No. 10-2010-0103410, filed Oct. 22, 2010, the contents of all of which are incorporated herein by reference in their entirety.

TECHNICAL FIELD

The present invention is directed to a multilayered biodegradable film having improved flexibility and transparency, which is useful for environmentally friendly packaging.

BACKGROUND ART

Conventional plastic films such as cellophane, polyvinyl chloride (PVC), polyethylene (PE), polypropylene (PP), nylon, and polyethylene terephthalate (PET) films have been widely employed for packaging. However, they are not completely satisfactory in terms of their performance characteristics.

For example, cellophane and polyvinyl chloride films generate toxic pollutants during the manufacturing and incinerating processes, respectively, and polyethylene films have been employed only for low-grade packaging materials due to their relatively poor heat-resistance and mechanical properties. Polypropylene, nylon and polyethylene terephthalate films, on the other hand, have satisfactory mechanical properties due to their relatively stable molecular structures, but generate wastes that are not biodegradable, and therefore, when subjected to a landfill without any separate treatment, they cause a significant soil pollution.

In order to solve such problems, there have been employed biodegradable aliphatic polyesters, particularly polylactic acid films. Such polylactic acid films have a good mechanical property, but represent a reduced flexibility due to their inherent crystal structures, which results in limitation to their use.

For the purpose of overcoming the aforementioned problem of the polylactic acid films, for example, Japanese Laid-open Patent Publication No. 2006-272712 discloses a method for preparing a biodegradable film composed of only a biodegradable aliphatic polyester resin except for polylactic acid. However, this method suffers from some problems in that the resulting sheet obtained during the manufacturing process is hardly subjected to a biaxial orientation due to its too low glass transition temperature (Tg), and the final film disadvantageously exhibits low mechanical strength and high heat shrinkage.

In addition, Japanese Laid-open Patent Publication No. 2003-160202 discloses that flexibility and heat sealing properties of a biodegradable film can be enhanced by blending polylactic acid with aliphatic-aromatic copolymerized polyesters. However, the transparency of the film thus obtained becomes significantly low due to poor compatibility between polylactic acid and the aliphatic-aromatic copolymerized polyesters as well as use of a plasticizer, and thus, the film is not satisfactory for packaging requiring transparency.

SUMMARY OF INVENTION

Accordingly, it is an object of the present invention to provide a biodegradable film having improved flexibility and transparency, which can be advantageously used for environmentally friendly packaging.

In accordance with the present invention, there is provided a multilayered biodegradable film comprising at least one first resin layer and at least one second resin layer, wherein:
 the first and second resin layers are alternately layered;
 the first resin layer comprises a polylactic acid-based polymer;
 the second resin layer comprises an aliphatic polyester-based resin or an aliphatic-aromatic copolymerized polyester-based resin; and
 the film has a coloring peak value of 0.3 or less, a haze of 10% or less, and an elastic modulus of 300 kgf/mm$^2$ or less.

BEST MODE FOR CARRYING OUT THE INVENTION

The multilayered biodegradable film in accordance with the present invention is characterized by comprising at least one first resin layer containing as major components a polylactic acid-based polymer and at least one second resin layer containing as major components an aliphatic polyester-based resin or an aliphatic-aromatic copolymerized polyester-based resin, which are alternately layered, the film having a coloring peak value of 0.3 or less, a haze of 10% or less, and an elastic modulus of 300 kgf/mm$^2$ or less.

The inventive film comprises at least one first resin layer consisted of a polylactic acid-based polymer or its copolymerization product with a small amount of other hydroxy carboxylic acid units.

The polylactic acid-based polymer used in the first resin layer has a melting temperature ($T_m$) of preferably 230° C. or less, more preferably 140 to 180° C. The hydroxy carboxylic acid unit may be glycolic acid or 2-hydroxy-3,3-dimethylbutylic acid and be used in an amount of 5% or less of the weight of the entire first resin layer.

The aliphatic polyester-based resin or the aliphatic-aromatic copolymerized polyester-based resin used in the second resin layer may be prepared by polymerizing an acid component comprising an aliphatic or aromatic dicarboxylic acid as a major component with a glycol component comprising alkyleneglycol as a major component. Exemplary aliphatic dicarboxylic acids include succinic acid, adipic acid, sebacic acid, glutaric acid, malonic acid, oxalic acid, azelaic acid, nonandicarboxylic acid, and a mixture thereof; and exemplary aromatic dicarboxylic acids include terephthalic acid, isophthalic acid, naphthalene-2,6-dicarboxylic acid, diphenylsulfonic acid dicarboxylic acid, diphenylether dicarboxylic acid, diphenoxyethane dicarboxylic acid, cyclohexane dicarboxylic acid, and a mixture thereof. It is also preferable that the acid component further comprises other aliphatic or aromatic dicarboxylic acid. Exemplary glycol includes alkyleneglycol such as ethyleneglycol, 1,3-propanediol, 1,4-butanediol, 1,5-pentanediol, 1,6-hexanediol, propyleneglycol, neopentylglycol, 2-methyl-1,3-propanediol, and diethyleneglycol, 1,4-cyclohexanediol, 1,4-cyclohexanedimethanol, polyethyleneglycol, and a mixture thereof. In order to enhance the overall biodegradability of the film, it is preferred that the aliphatic component is used in an amount of 30% or more of the weight of the entire acid component, and it is more preferred that an aliphatic-aromatic copolymerized polyester-based resin containing the aliphatic component in an amount of 50% by mole or more of the entire acid component is used in formation of the second resin layer.

The film in accordance with the present invention may further comprise at least one third resin layer which is disposed between the first and second resin layers, wherein the third resin layer comprises as a major component an aliphatic polyester-based resin or an aliphatic-aromatic copolymerized polyester-based resin of which examples are listed above, but which is different from that used in the second resin layer.

The first, second and third resin layers of the inventive film may further comprise other additives such as an electrostatic generator, anti-static agent, antioxidant, heat stabilizer, UV blocking agent, anti-blocking agent and inorganic lubricant to the extent they do not adversely affect the film properties.

The inventive multilayered film may be prepared by a conventional method, for example, by melt-extruding each resin for forming the first and the second resin layers using an extrusion die, alternately laminating the extrudates to form a multilayered undrawn sheet, and drawing the sheet. Specifically, the resins for forming the first and the second resin layers are diverged into at least 3 layers and at least 2 layers, respectively, and then the first and the second resin layers thus formed are alternately laminated in a multi-feed block. Wherein, it is preferred that the first resin layer forms both outermost layers of the film, and that the total thickness of the both outermost layers (supporting layers) is in a range of 5 to 50%, preferably 10 to 40% of the total thickness of the film. When the sum is more than 50%, the flexibility of the resulting film is not satisfactory, and when less than 5%, the heat-resistance and mechanical properties thereof become poor.

The total layer number of the film may be appropriately controlled depending on a thickness of each of individual resin layers. It may be composed of 5 layers or more, preferably 7 to 220 layers.

An average thickness of each first resin layer except for the outermost layer may be preferably in a range of 133 to 5,000 nm, more preferably 200 to 3,000 nm. When the average thickness is less than 133 nm, interference phenomena among lights in the field of a visible ray wavelength are overlapped with each other due to the difference in a refractive index between the first and the second resin layers, resulting in generation of undesired stain or color in the film. When the average thickness is more than 5,000 nm, the flexibility of the resulting film becomes poor.

A lower value of an average thickness of each resin layer including the first and second resin layers may be determined by an equation $[\lambda/4n]$ (wherein, $\lambda$ is the red-light wavelength, 780 nm, and n is a refractive index of an individual first or second resin layer). For example, when the first resin layer has the refractive index of 1.465, the lower value of the average thickness of the first resin layer becomes 133 nm.

The inventive multilayered film has a coloring peak value of 0.3 or less, which is determined by the combination of a refractive index and an average thickness of an individual resin layer as an index showing the coloring degree of the film. Its lower value means a state close to colorlessness and transparency, and its higher value does a state stained or unnecessarily colored.

The inventive multilayered film has a haze of 10% or less, preferably 5% or less. The film having a haze exceeding 10% exhibits unsatisfactory transparency.

In addition, the inventive multilayered film has an elastic modulus of 300 kgf/mm$^2$ or less, preferably 250 kgf/mm$^2$ or less. In contrast, a conventional polylactic acid-based polymer film has an elastic modulus of 350 kgf/mm$^2$ or more, being too stiff due to lack of flexibility, which is not suitable for packaging.

Further, the inventive multilayered film has a biodegradability of 60% or more, preferably 80% or more, more preferably 90% or more.

In the present invention, for the purpose of enhancing the effect of post-processing procedures, inert inorganic particles as an anti-static agent or anti-blocking agent may be coated on one or two portions of both outermost layers of the film, and the one or two portions may be subjected to a corona or coating treatment for improvement of a processing or printing property of the film.

As described above, the inventive multilayered film can be efficiently used as an environmentally friendly packaging material due to its superior flexibility, transparency, and biodegradability.

The following Examples are given for the purpose of illustration only, and are not intended to limit the scope of the invention.

Example 1: Preparation of Multilayered Biodegradable Film—(1)

95% by weight of the polylactic acid resin (Nature Works LLC, 4032D) having a melting temperature of 160° C. and 5% by weight of a master batch resin prepared by dispersing silicon dioxide having an average particle size of 2 μm in the same polylactic acid resin were blended so that the silicon dioxide content of the resulting film became 0.05% by weight, which was used as a resin for forming a first resin layer. Polycaprolactone (PCL), 100% aliphatic polyester, was used as a resin for forming a second resin layer.

The resin for forming a first resin layer was subjected to drying at a hot air drier of 110° C. for 3 hrs, and the resin for forming a second resin layer was subjected to drying at a moisture-removing drier of 45° C. for 5 hrs. The resins for forming first and second resin layers were melt-extruded at 220 and 140° C., respectively, by introducing them into respective feed blocks of two extruders, diverged into 22 layers and 21 layers, respectively, and then alternately laminated in a multi-feed block. The resulting laminate was cooled by passing through a cooling roll maintained to 20° C., to obtain an undrawn laminate sheet of total 43 layers of which the outermost layers were composed of the resin for forming a first resin layer. The total thickness of the outermost layers was 24% of the total thickness of the film.

The sheet was quickly pre-heated to 60° C., drawn at a ratio of 3.0 in the longitudinal direction (LD), further pre-heated to 75° C. and drawn at a ratio of 3.8 in the transverse direction (TD), and then heat-set at 110° C., to obtain a biaxially oriented laminated film of 25 μm thickness and 43 layers.

Example 2: Preparation of Multilayered Biodegradable Film—(2)

The procedure of Example 1 was repeated except that polybutylene succinate (PBS), 100% aliphatic polyester, was used as a resin for forming a second resin layer, the resins for forming first and second resin layers were diverged into 3 layers and 2 layers, respectively, and the total thickness of the outermost layers was controlled to be 40% of the total thickness of the film, to obtain a biaxially oriented laminated film of 25 μm thickness and 5 layers.

Example 3: Preparation of Multilayered Biodegradable Film—(3)

The procedure of Example 1 was repeated except that polybutylene succinate (PBS), 100% aliphatic polyester, was used as a resin for forming a second resin layer, the resins for forming first and second resin layers were diverged into 73 layers and 72 layers, respectively, and the total thickness of the outermost layers was controlled to be 8% of the total thickness of the film, to obtain a biaxially oriented laminated film of 25 μm thickness and 145 layers.

Example 4: Preparation of Multilayered Biodegradable Film—(4)

The procedure of Example 1 was repeated except that polybutylene adipate-terephthalate (PBAT) resin, aliphatic-aromatic copolymerized polyester, containing the aliphatic component in an amount of 50% of the weight of the entire acid component was used as a resin for forming a second resin layer, and the total thickness of the outermost layers was controlled to be 32% of the total thickness of the film, to obtain a biaxially oriented laminated film of 25 μm thickness and 43 layers.

Comparative Example 1: Preparation of Monolayered Biodegradable Film—(1)

95% by weight of the polylactic acid resin (Nature Works LLC, 4032D) and 5% by weight of a master batch resin prepared by dispersing silicon dioxide having an average particle size of 2 μm in the same polylactic acid resin were blended so that the silicon dioxide content of the resulting film became 0.05% by weight. The resulting resin was subjected to drying at a hot air drier of 110° C. for 3 hrs, melt-extruded at 220° C., and cooled by passing through a cooling roll maintained to 20° C., to obtain an undrawn monolayered sheet. The sheet was quickly pre-heated to 75° C., drawn at a ratio of 3.0 in the longitudinal direction (LD), further pre-heated to 80° C. and drawn at a ratio of 3.8 in the transverse direction (TD), and then heat-set at 130° C., to obtain a biaxially oriented monolayered film of 25 μm thickness.

Comparative Example 2: Preparation of Monolayered Biodegradable Film—(2)

The procedure of Comparative Example 1 was repeated except that 70% by weight of the resin for forming a first resin layer and 30% by weight of the resin for forming a second resin layer which were used in Example 2 or 3 were blended, and the resulting resin was subjected to drying at a moisture-removing drier of 50° C. for 5 hrs, and melt-extruded at 200° C., to obtain an undrawn monolayered sheet. The sheet was quickly pre-heated to 70° C., drawn at a ratio of 3.0 in the longitudinal direction (LD), further pre-heated to 75° C. and drawn at a ratio of 3.8 in the transverse direction (TD), and then heat-set at 120° C., to obtain a biaxially oriented monolayered film of 25 μm thickness.

Comparative Example 3: Preparation of Multilayered Biodegradable Film—(5)

The procedure of Example 1 was repeated except that polybutylene succinate (PBS), 100% aliphatic polyester, was used as a resin for forming a second resin layer, the resins for forming first and second resin layers were diverged into 2 layers and 1 layer, respectively, and the total thickness of the outermost layers was controlled to be 48% of the total thickness of the film, to obtain a biaxially oriented laminated film of 25 μm thickness and 3 layers.

Comparative Example 4: Preparation of Multilayered Biodegradable Film—(6)

The procedure of Example 1 was repeated except that polybutylene succinate (PBS), 100% aliphatic polyester, was used as a resin for forming a second resin layer, the resins for forming first and second resin layers were diverged into 126 layers and 125 layer, respectively, and the total thickness of the outermost layers was controlled to be 4% of the total thickness of the film, to obtain a biaxially oriented laminated film of 25 μm thickness and 251 layers.

Comparative Example 5: Preparation of Multilayered Biodegradable Film—(7)

The same as that used in Example 1 was used as a resin for forming a first resin layer, and polyethylene terephthalate (PET) resin, aromatic polyester, containing the aromatic component in an amount of 100% of the weight of the entire acid component was used as a resin for forming a second resin layer.

The resin for forming a first resin layer was subjected to drying at a moisture-removing drier of 110° C. for 3 hrs, and the resin for forming a second resin layer was subjected to drying at a hot air drier of 120° C. for 5 hrs. The resins for forming first and second resin layers were melt-extruded at 230 and 270° C., respectively, by introducing them into respective feed blocks of two extruders, diverged into 22 layers and 21 layers, respectively, and then alternately laminated in a multi-feed block. The resulting laminate was cooled by passing through a cooling roll maintained to 20° C., to obtain an undrawn laminate sheet of total 43 layers of which the outermost layers were composed of the resin for forming a first resin layer. The sum of the thicknesses of the outermost layers was 20% of the total thickness of the film.

The sheet was quickly pre-heated to 90° C., drawn at a ratio of 3.0 in the longitudinal direction (LD), further pre-heated to 110° C. and drawn at a ratio of 3.8 in the transverse direction (TD), and then heat-set at 150, to obtain a biaxially oriented laminated film of 25 μm thickness and 43 layers.

Performance Test

The films obtained in Examples 1 through 4 and Comparative Examples 1 through 5 were each assessed for the following properties. The results are shown in Table 1.

(1) Melting Temperature ($T_m$, ° C.)

Differential scanning calorimeter (Perkin-Elmer, DSC-7) analysis was performed at a temperature programming rate of 10° C./min. The melting temperature was determined from peaks in the heat absorption curve.

(2) Coloring Peak Value

The absorbance of a film sample at an incident light wavelength of 400 to 780 nm was measured using UV-Visible Meter (Japan Shimazu, UV-265FW). The maximum absorbance value was designated as the coloring peak value.

(3) Haze (%)

The haze of a film sample was measured with a hazemeter (Nihohn Semitsu Kogaku, SEP-H).

(4) Elastic Modulus (kgf/mm$^2$)

The initial elastic modulus of a film sample was determined using UTM (Instron, 4206-001) according to ASTM D882.

(5) Biodegradability (%)

The biodegradability of a film sample was evaluated according to KS M3100-1 (2003), and the ratio of biodegradability value of the film sample and that of a standard material over a period of 180 days was calculated according to the following equation:

$$\text{Biodegradability}(\%) = \frac{\text{Biodegradability of film sample}}{\text{Biodegradability of standard material}} \times 100$$

TABLE 1

|  |  |  | Unit | Ex. 1 | Ex. 2 | Ex. 3 | Ex. 4 | C.E. 1 | C.E. 2 | C.E. 3 | C.E. 4 | C.E. 5 |
|---|---|---|---|---|---|---|---|---|---|---|---|---|
| First resin layer | Resin |  | — | PLA | PLA | PLA | PLA | PLA | PLA | PLA | PLA | PLA |
|  | Alternate layer | Number | Layer | 20 | 1 | 71 | 20 | 1 | 1 | — | 124 | 20 |
|  |  | Thickness | nm | 475 | 5000 | 162 | 425 | 25000 | 25000 | — | 97 | 500 |
|  | Outermost layer | Number | Layer | 2 | 2 | 2 | 2 | — | — | 2 | 2 | 2 |
|  |  | Thickness | μm | 6 | 10 | 2 | 8 | — | — | 12 | 1 | 5 |
|  |  | Thickness ratio | % | 24 | 40 | 8 | 32 | — | — | 48 | 4 | 20 |
| Second resin layer | Resin |  | — | PCL | PBS | PBS | PBAT | — | PBS | PBS | PBS | PET |
|  | Aliphatic content |  | mol % | 100 | 100 | 100 | 50 | — | 100 | 100 | 100 | 0 |
|  | Number |  | Layer | 21 | 2 | 72 | 21 | — | — | 1 | 125 | 21 |
|  | Thickness |  | nm | 452 | 5000 | 160 | 405 | — | — | 13000 | 96 | 476 |
| Total layer number |  |  | Layer | 43 | 5 | 145 | 43 | 1 | 1 | 3 | 251 | 43 |
| Coloring peak value |  |  | — | 0.07 | 0.05 | 0.10 | 0.04 | 0.03 | 0.07 | 0.04 | 0.50 | 0.10 |
| Haze |  |  | % | 4.0 | 2.8 | 4.5 | 2.0 | 3.5 | 48 | 2.5 | 5.0 | 4.0 |
| Elastic modulus |  |  | kgf/mm$^2$ | 220 | 290 | 200 | 220 | 350 | 250 | 310 | 180 | 340 |
| Biodegradability |  |  | % | 96 | 98 | 100 | 98 | 100 | 100 | 98 | 95 | 60 |

As shown in Table 1, the inventive multilayered films of Examples 1 to 4 showed more improved properties in terms of flexibility, transparency, and biodegradability, as compared with those of Comparative Examples 1 to 5.

While the invention has been described with respect to the above specific embodiments, it should be recognized that various modifications and changes may be made to the invention by those skilled in the art which also fall within the scope of the invention as defined by the appended claims.

What is claimed is:

1. A multilayered biodegradable film comprising at least one first resin layer and at least one second resin layer, wherein:
   the first and second resin layers are alternately layered;
   the first resin layer comprises a polylactic acid-based polymer;
   the second resin layer comprises an aliphatic polyester-based resin that is different from the polylactic-acid based polymer or an aliphatic-aromatic copolymerized polyester-based resin; and
   the multilayered biodegradable film has a coloring peak value of 0.3 or less, a haze of 10% or less, and an elastic modulus of 300 kgf/mm$^2$ or less,
   wherein the multilayered biodegradable film is a laminated film composed of 43 to 220 layers;
   wherein the first resin layer forms both outermost layers of the multilayered biodegradable film; and
   wherein an average thickness of each of the first resin layers except for the two first resin layers forming the outermost layers is in a range of 133 to 5,000 nm.

2. The multilayered biodegradable film of claim 1, wherein the second resin layer is composed of an aliphatic-aromatic copolymerized polyester-based resin containing an aliphatic acid component in an amount of 50% by mole or more of the total acid component in forming the aliphatic-aromatic copolymerized polyester-based resin.

3. The multilayered biodegradable film of claim 1, which further comprises at least one third resin layer which is disposed between the first and second resin layers, the third resin layer comprising an aliphatic polyester-based resin or an aliphatic-aromatic copolymerized polyester-based resin which is different from that used in the second resin layer.

4. The multilayered biodegradable film of claim 1, wherein the total thickness of the both outermost layers is in a range of 5 to 50% of the total thickness of the film.

5. The multilayered biodegradable film of claim 1, which has a biodegradability of 60% or more.

6. A wrapping material comprising the multilayered biodegradable film according to claim 1.

* * * * *